United States Patent [19]

Kurth et al.

[11] Patent Number: 5,010,926
[45] Date of Patent: Apr. 30, 1991

[54] INSULATION ACCESS APERTURE LINER

[76] Inventors: Herman Kurth, 600 N. 18th Pl.;
David Kemble, 2410 Francis Rd.;
Romeo N. Ubungen, 2307 N. 18th Pl.,
all of Mount Vernon, Wash. 98273

[21] Appl. No.: 325,458

[22] Filed: Mar. 17, 1989

[51] Int. Cl.⁵ .......................... F16L 55/10; F16L 9/14
[52] U.S. Cl. ...................... 138/149; 138/90; 138/92
[58] Field of Search ............ 138/89, 90, 92, 94, 138/149

[56] References Cited

U.S. PATENT DOCUMENTS

| | | | |
|---|---|---|---|
| 177,432 | 5/1876 | Smith | 138/92 |
| 2,741,117 | 4/1956 | Hoseason | 138/92 |
| 3,658,096 | 4/1972 | Higuera | 138/90 |
| 3,756,287 | 9/1973 | Bishop | 138/92 |
| 3,827,462 | 8/1974 | Celesta | 138/90 |
| 4,091,842 | 5/1978 | Greenawalt et al. | 138/90 |

FOREIGN PATENT DOCUMENTS 659428  3/1963  Canada ............... 138/92

Primary Examiner—James E. Bryant, III
Attorney, Agent, or Firm—David L. Garrison

[57] ABSTRACT

A closable through insulation access aperture liner to permit inspection of the wall of an insulated pipe or vessel which liner isolates insulation and prevents insulation material, such as asbestos, from contamination of workers and work area.

12 Claims, 2 Drawing Sheets

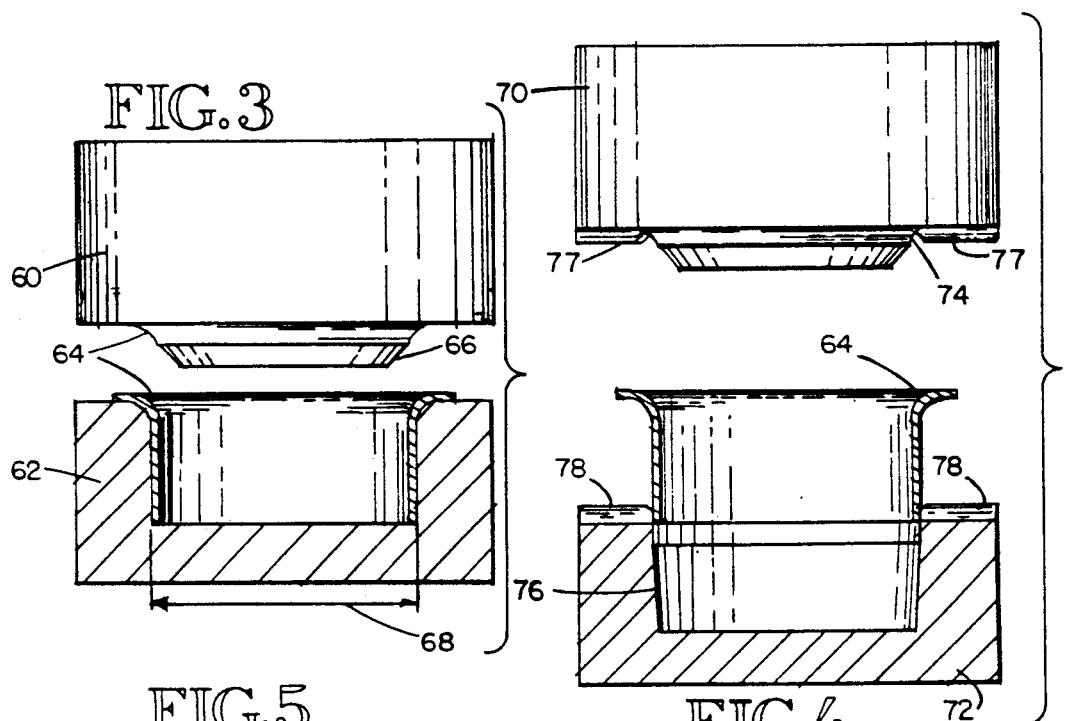
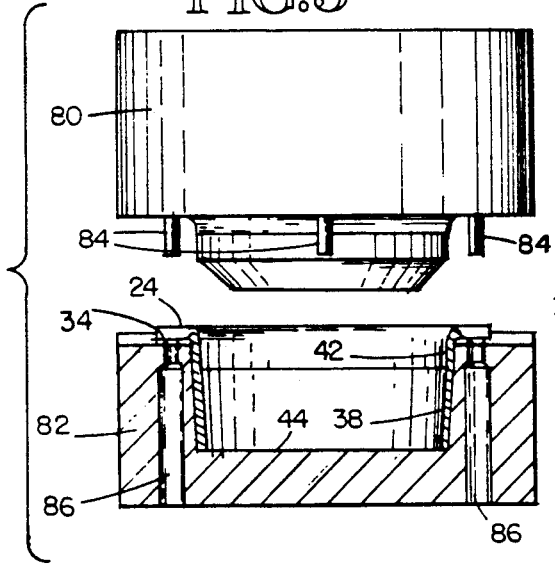
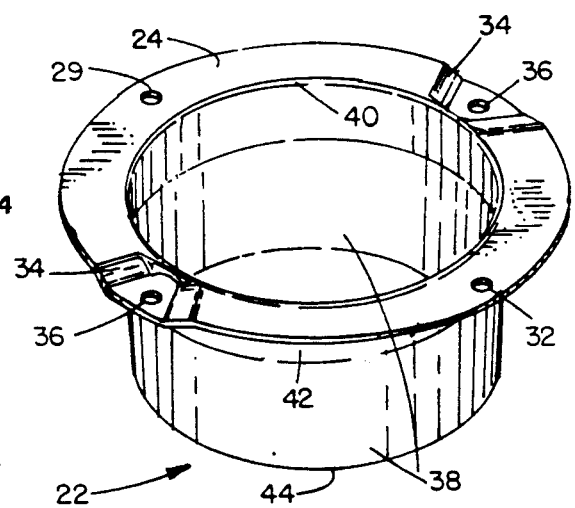
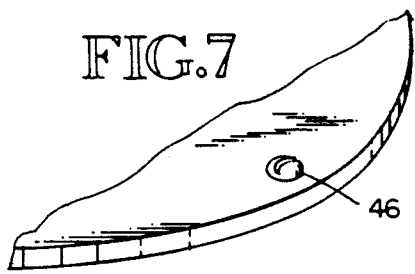
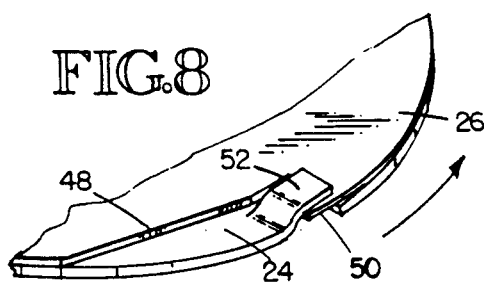

INSULATION ACCESS APERTURE LINER

BACKGROUND OF THE INVENTION

This invention relates to a liner for an access hole cut through an insulation material enclosing or placed upon a pipe vessel or tank, especially of the type used in cryogenic or high temperature systems, such as for example, in refineries, chemical processing equipment, power generating facilities and the like.

BACKGROUND OF THE INVENTION AND PRIOR ART

Process piping, steam piping, vessels and the like frequently used in chemical processing plants, nuclear power generation facilities, petro-chemical refineries, and the like are frequently covered with a thick layer of insulation of various types such as ceramics, fiber glass, and in many older installations, asbestos containing insulation materials. The pipes or container which are thus insulated frequently are subjected to corrosive atmospheres on the interior or in some instances to high levels of erosion through high velocity fluid transportation therein. Extensive corrosion or erosion of the metal wall results in failure and it is desirable to be able to have access to various locations of the wall material to determine the remaining thickness so that failure can be averted. Periodic checks of the thickness of the material permit maintenance personnel to schedule replacement activities so that unanticipated shutdown of the system can be avoided.

One of the preferred procedures to determine the thickness of remaining metal in the wall of the pipe, vessel, tank or other member is to employ an ultrasonic device for non-destructive testing of the thickness of the pipe, vessel or wall. Such ultrasonic test devices employ ultrasonic transducers which must be held or otherwise secured against the metal wall in order to make the appropriate thickness determination. The presence of the insulating material prevents such test activity and the insulating material must ordinarily be removed wherever tests are to be made. Following the test it is desirable to replace the insulation to avoid excessive heat loss or gain and possible injury to workers.

Various demountable insulating plug configurations have been tried in the past including that shown in the U.S. Pat. No. 3,658,096 issued to Robert Higgers and assigned to San Roy Development Company Incorporated, San Rafael, California. While providing an demountable insulating plug, the plug is easily lost and provides no internal integrity for the insulation material such that the portion of insulating material surrounding the plug removed for access is exposed to workers. Whenever the insulating material contains asbestos or ceramics, there exists the possibility of contamination of the workers and the nearby work area.

SUMMARY OF THE INVENTION

The present invention provides a preferred type of insulation aperture liner and access means which provides in addition to the foregoing parameters, a completely closed access aperture which may be easily opened to permit any necessary measurement of wall thickness yet seals off the insulation material from exposure to workers. A substantially tubular body is formed of an appropriate material such as aluminum with an appropriately dimensioned radially extending flange for locating the body in an aperture cut into the insulation material. The flange is substantially coaxial with the body and is provided with fastener receiving apertures to permanently attach the device to the skin surrounding the insulation and to provide a pivotally mounted closure which may be releasably fixed into a closed position, being substantially coaxial with the body and flange, closing the liner body whenever access to the metal wall of the pipe, vessel or tank is not desired. In a preferred embodiment the liner body has a tapered substantially frustoconical distal portion to permit use of the device in varying depths of access ports through the use of a tubular extension surrounding and thereby attached to the tapered portion of the liner body and extending inwardly to the vessel, pipe or tank wall.

The liner body is preferably constructed of an appropriate ductile metal, such as aluminum, steel or titanium, and may be integrally formed by a series of metal forming steps from a short section of pipe or tubing of an appropriate diameter. The flange is first formed by upsetting the metal at one end of the tubular section and in subsequent forming steps, appropriate fastener apertures, recesses and tapered body portions are formed with known techniques. In an alternate form, plastic materials may be used by injecting molding or similar process. A disk shaped top closure is formed from a sheet of appropriate material and attached to the liner body at the flange with an appropriate pivotal fastener such as a rivet.

In use, a substantially cylindrical plug of insulating material is removed together with a circular disk of the insulation skin material. The liner body, formed as described above or by a equivalent process such as injection molding, is then inserted into the hole either with or without a tubular extension as needed to completely close the surface of the insulating material and completely line the access aperture providing access to the surface of the pipe, tank or vessel. An insulation cement may be used to grout the liner body into its permanent location if desired. The liner body is then fastened with the appropriate fasteners through the flange to the skin surrounding the insulation to hold the liner body in place. The hole into which the liner body is inserted is preferably sized for an interference fit to securely maintain the integrity of the insulation material thereby preventing accidental exposure of workers to the insulation. A plug of appropriate and non-toxic insulation material may be placed within the liner body to provide insulation when the access port is not in use.

To use the access port, the top is rotated 180 degrees or thereabout, the insulation plug removed and any desired testing procedures undertaken. The insulation plug is then replaced and the access port closed and secured with a fastener whereby accidental access or opening of the port is precluded.

BRIEF DESCRIPTION OF THE DRAWINGS

FIG. 3, 4 and 5 show typical metal working steps used in the preparation of the apparatus of this invention.

FIGS. 6 is a perspective view of a finished insulation access aperture liner.

FIG. 7 is a fragmentary view of the top of the apparatus of this invention showing one means of fastening the top to the flange.

FIG. 8 is a second embodiment of a fastener mechanism interengaging the top with the body of the liner of this invention.

DESCRIPTION OF THE PREFERRED EMBODIMENTS

Figure 1:
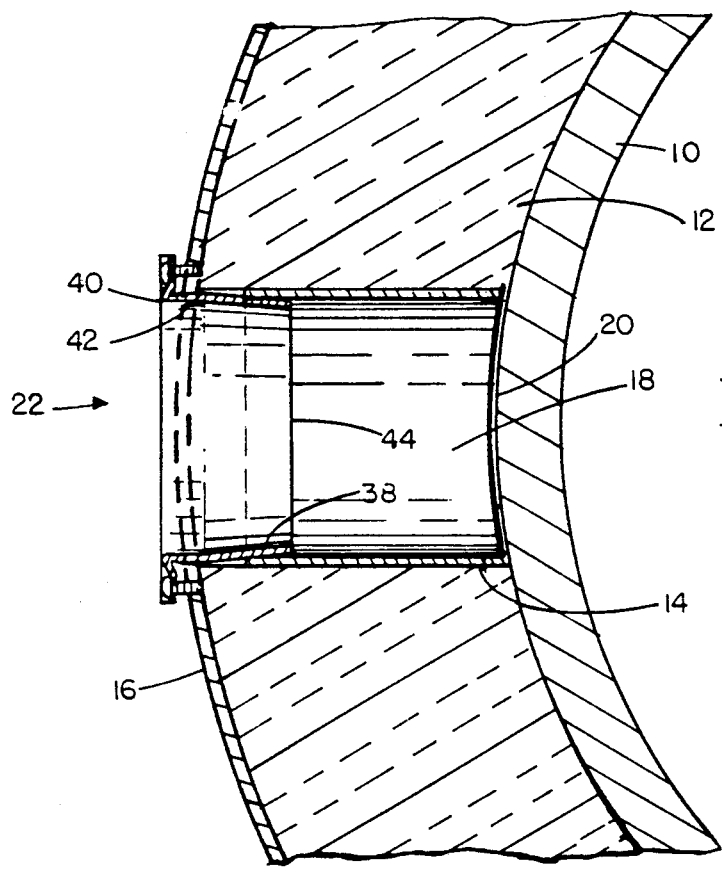
FIG. 1 is a side elevational view partly in section of the apparatus of this invention, shown projecting through the insulation and to a pipe wall.
Figure 2:
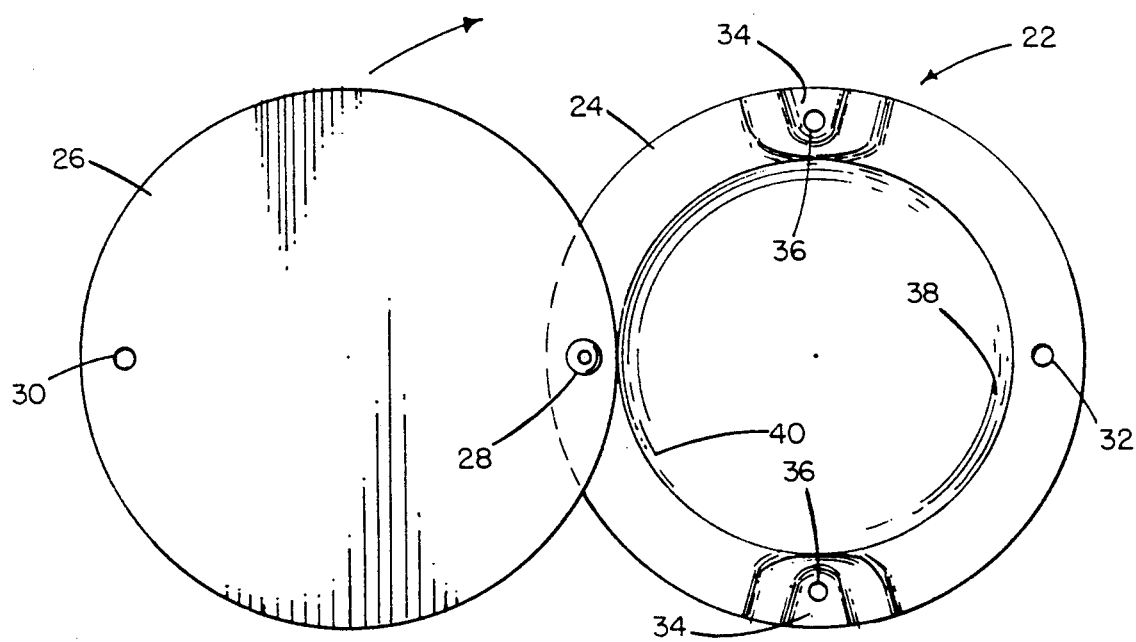
FIG. 2 is a plan view of the apparatus of this invention.

Referring to the drawings, wherein like numerals indicate like parts, there is shown in FIG. 1 a portion of a wall member 10, such as a pipe or a tank or other similar member for carrying or containing very high or very low temperature fluids or fluids carried to high velocities which member 10 is provided with an insulating material 12 extending outwardly therefrom. Typically, the insulation is in the nature of a glass fiber, asbestos or other type of well known insulation material usually covered by a thin metal outer skin 16. A hole 14, usually of a circular configuration is cut through the insulating material and through the skin 16 to expose the surface of wall 10. An elongated tubular extension 18 is shown surrounding the tapered portion 38 of a metal liner body 22 positioned at the open end of the cut into insulation 12. Body 22 is formed having a substantially cylindrical portion and a flange portion 24. The substantially cylindrical portion has a cylindrical zone 42 and a tapered zone 38. Fastener recesses 34 are shown in radially extending flange 24 with fastener hole 36 positioned therein to receive a fastener for engaging skin 16.

Flange 24 is formed as an integral part of the body 22 and attaches to cylindrical zone 42 at flange curve 40. Cylindrical zone 42 in turn is formed into taper 38 to provide the shape of the liner body as shown.

Tubular extension 18, or in some instances liner body 22, may be provided with a saddle cut 20 on its interior or distal end to provide a close fit with wall 10 thereby preventing entry of the insulating material into the interior of extension 18.

Body 22 may be easily formed from a ductile tubing material such as a ductile aluminum alloy. For example, aluminum alloys in the 5052 or 6061 series, preferably seamless tubing segments are suitable materials. Other aluminum, titanium or steel alloys of sufficient ductility or appropriate plastics, may also be used for body 22. FIGS. 3, 4, and 5 show a series of manufacturing steps which may be utilized to form the liner body. In FIG. 3 a female flange forming die 62 is shown below male flange forming die 60. The initial forming step is shown in FIG. 3 with a flange radius 64 larger than the radius 40 formed in the final forming step to avoid cracking of the material being formed. A cylindrical segment of tubing is placed into female die 62 and male die 60 forced downwardly into forming contact with the tubing segment. Flange 24 is thus upset and formed into the intermediate shape shown. The partially completed body is then moved to the apparatus shown in FIG. 4. In FIG. 4 a recess and taper forming female die 72 is used which mates with a recess and taper forming male die 70. Male die 70 has a pair of male recess formers 77 shown on opposite sides of the die with a sharper flange radius 74 shown to form the desired flange radius 40 at it final dimensions. Taper forming surface 76 is shown adapted to receive the lower portion of the partially formed body and to force it into the desired tapered structure. Female die 72 includes female recess formers 78 to receive the male recess formers 77 and thereby form fastener recesses described more fully below.

In FIG. 5 the final step of the forming is shown in which apertures in the flange 24 are punched. Hole punching female die 82 is shown with waste apertures 86 for disposal of the punched waste material. A plurality of hole punch rods 84 are shown positioned about the periphery of male hole punching die 80 to mate with apertures 86 and complete the punching step.

In FIG. 6 a perspective view of the finished access aperture liner is shown with the features described above.

Two alternate embodiments of the fastener means for securing the top in place are shown in FIGS. 7 and 8. A fastener 46 is shown on FIG. 7 inserted through appropriate fastener apertures, while offset fingers cut into the flange and the top are shown in FIG. 8. Top finger 50 interengages flange finger 52 to fasten and securely hold the top in the closed position. A cut out portion 48 is shown relieved from top 26 to permit passage of the flange finger 52 into its operative position as shown.

Other hinge type interengagement between the body 22 and top 26 may be used or simple fasteners may be used to hold top 26 in place when access to wall 10 is not needed.

In compliance with the statute, the invention has been described in language more or less specific as to structural features. It is to be understood, however, that the invention is not limited to the specific features shown, since the means and construction herein disclosed, comprise a preferred form of putting the invention into effect. The invention is, therefore, claimed in any of its forms or modifications within the legitimate and valid scope of the appended claims appropriately interpreted in accordance with the Doctrine of Equivalence.

We claim:

1. A through insulation access aperture liner to provide visual access to an insulated pipe wall comprising:
   a body having a substantially cylindrical portion depending from a flange, said flange having means to attach said body to the outer surface of said insulation;
   a tubular extension extending from said substantially cylindrical body section to said wall, said extension including a saddle cut end mating with said wall to prevent entry of insulation into said body; and
   cover means pivotally mounted on said flange for closing the outer opening of said liner.

2. The apparatus of claim 1 further including a tubular extension extending from said substantially cylindrical body section to a wall, said wall being covered by said insulation.

3. The apparatus of claim 1 wherein said body further includes a substantially cylindrical zone and a tapered zone, said cylindrical zone being connected to said flange by a flange curve.

4. The apparatus of claim 2 wherein said extension includes a saddle cut end mating with said wall.

5. An access hole liner for use on an insulated wall of a pipe, vessel, or tanks to provide access for testing or examining the wall comprising:
   a radially extending flange having fastener aperture therein for fastening said flange to said insulation;
   a substantially cylindrical liner body depending axially from said flange and extending into contact with said wall, the distal end thereof being formed into a saddle cut end mating with said wall, thereby preventing entry of insulation material into said liner body; and a cover pivotally attached to said flange, said cover rotatable from a closed position coaxial with said liner body and flange to an open position permitting access inside said liner body.

6. The apparatus of claim 5 wherein said liner body comprises a cylindrical portion and a tapered frusto-conical portion, said cylindrical portion, being positioned between and attached to said flange and said tapered frusto-conical portion.

7. The apparatus of claim 6 wherein said flange and said body are integral.

8. The apparatus of claim 7 wherein said liner is formed by metal forming techniques from a segment of metal tubing.

9. The apparatus of claim 5 wherein said liner is molded by injection molding techniques.

10. The apparatus of claim 5 wherein said flange and said body meet in a smooth flange curve.

11. The apparatus of claim 5 and fastener means to maintain said cover in the closed position.

12. The apparatus of claim 5 wherein said body further comprises a tubular extension to line an extended hole through thick insulation.

* * * * *